United States Patent
Ji et al.

(10) Patent No.: US 11,914,221 B2
(45) Date of Patent: Feb. 27, 2024

(54) CAMERA OPTICAL LENS

(71) Applicant: AAC Optics (Suzhou) Co., Ltd., Suzhou (CN)

(72) Inventors: Yonghua Ji, Shenzhen (CN); Wen Sun, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 599 days.

(21) Appl. No.: 17/138,820

(22) Filed: Dec. 30, 2020

(65) Prior Publication Data

US 2022/0066167 A1     Mar. 3, 2022

(30) Foreign Application Priority Data

Sep. 3, 2020 (CN) .......................... 202010917558.1

(51) Int. Cl.
    *G02B 9/60*          (2006.01)
    *G02B 13/00*        (2006.01)

(52) U.S. Cl.
    CPC ........... *G02B 9/60* (2013.01); *G02B 13/0045* (2013.01)

(58) Field of Classification Search
None
See application file for complete search history.

(56) References Cited

U.S. PATENT DOCUMENTS

| | | | | |
|---|---|---|---|---|
| 11,762,173 B2* | 9/2023 | Kuo | ......................... | G02B 9/60 359/714 |
| 11,782,247 B2* | 10/2023 | Shi | ..................... | G02B 13/0045 359/714 |
| 11,828,910 B2* | 11/2023 | Wei | ..................... | G02B 13/0045 |
| 2011/0249347 A1* | 10/2011 | Kubota | .............. | G02B 13/0045 359/764 |
| 2014/0218812 A1* | 8/2014 | Liou | .................. | G02B 13/0045 359/764 |
| 2014/0320984 A1* | 10/2014 | Kubota | .................... | G02B 9/60 359/714 |
| 2016/0349486 A1* | 12/2016 | Teraoka | ............. | G02B 13/0045 |
| 2016/0370559 A1* | 12/2016 | Teraoka | ............. | G02B 27/0025 |
| 2017/0102525 A1* | 4/2017 | Teraoka | ............. | G02B 13/0045 |
| 2018/0113281 A1* | 4/2018 | Tsai | ....................... | G02B 5/208 |
| 2018/0164548 A1* | 6/2018 | Wang | ...................... | G02B 9/60 |

\* cited by examiner

*Primary Examiner* — Darryl J Collins
(74) *Attorney, Agent, or Firm* — W&G Law Group

(57) ABSTRACT

A camera optical lens includes five-piece lenses, from an object side to an image side. The camera optical lens satisfies conditions of $-3.50 \leq f2/f1 \leq -1.80$, $1.00 \leq (R7+R8)/(R7-R8) \leq 1.75$, $1.30 \leq d6/d4 \leq 2.00$, $5.00 \leq (R5+R6)/(R5-R6) \leq 20.00$ and $-5.00 \leq R9/R10 \leq -1.50$. Here f1, f2 denote a focal length of the first lens and the second lens; R5, R6 denote a curvature radius of an object-side surface and an image-side surface of the third lens; R7, R8 denote a curvature radius of an object-side surface and an image-side of the fourth lens; R9, R10 denote a curvature radius of an object-side surface and an image-side surface of the fifth lens; d4 denotes an on-axis distance from an image-side surface of the second lens to the object-side surface of the third lens. The camera optical lens of the present disclosure has excellent optical performances, and meanwhile can meet design requirements of a large aperture, a wide angle and ultra-thin.

9 Claims, 9 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the development of camera technology, camera optical lenses are widely used in various electronic products, such as smart phones and digital cameras. In order to facilitate portability, people are increasingly pursing lighter and thinner electronic products. Therefore, miniaturized camera optical lenses with good image quality have become a mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, a five-piece structure gradually appear in lens designs. Although the five-piece lens already has good optical performance, its focal power, lens spacing and lens shape are still unreasonable, resulting in the lens structure still cannot meet the design requirements of a large aperture, ultra-thin and a wide angle while having good optical performance.

Therefore, it is necessary to provide an imaging optical lens that has better optical performance and meets design requirements of a large aperture, a wide angle and ultra-thin.

SUMMARY

An objective of the present disclosure is to provide a camera optical lens, which aims to solve the insufficient problem of a wide angle and ultra-thin of a traditional imaging optical lens.

To solve the above problems, some embodiments of the present disclosure is to provides a camera optical lens including five-piece lenses, from an object side to an image side, the five-piece lenses are: a first lens having a positive refractive power, a second lens having a negative refractive power, a third lens having a negative refractive power, a fourth lens having a positive refractive power, and a fifth lens having a negative refractive power.

The camera optical lens satisfies conditions of $-3.50 \leq f2/f1 \leq -1.80$, $1.00 \leq (R7+R8)/(R7-R8) \leq 1.75$, $1.30 \leq d6/d4 \leq 2.00$, $5.00 \leq (R5+R6)/(R5-R6) \leq 20.00$, and $-5.00 \leq R9/R10 \leq -1.50$. Herein f1 denotes a focal length of the first lens, f2 denotes a focal length of the second lens, R5 denotes a curvature radius of an object-side surface of the third lens, R6 denotes a curvature radius of an image-side surface of the third lens, R7 denotes a curvature radius of an object-side surface of the fourth lens, R8 denotes a curvature radius of an image-side surface of the fourth lens, R9 denotes a curvature radius of an object-side surface of the fifth lens, R10 denotes a curvature radius of an image-side surface of the fifth lens, d4 denotes an on-axis distance from an image-side surface of the second lens to the object-side surface of the third lens, and d6 denotes an on-axis distance from the image-side surface of the third lens to the object-side surface of the fourth lens.

Preferably, the camera optical lens further satisfies a condition of $4.00 \leq d1/d2 \leq 8.00$. Herein d1 denotes an on-axis thickness of the first lens, and d2 denotes an on-axis distance from an image-side surface of the first lens to an object-side surface of the second lens.

Preferably, the camera optical lens further satisfies conditions of $0.37 \leq f1/f \leq 1.30$, $-3.10 \leq (R1+R2)/(R1-R2) \leq -0.71$, and $0.06 \leq d1/TTL \leq 0.21$. Herein f denotes a focal length of the camera optical lens, R1 denotes a curvature radius of an object-side surface of the first lens, R2 denotes a curvature radius of an image-side surface of the first lens, d1 denotes an on-axis thickness of the first lens, and TTL denotes a total optical length from the object-side surface of the first lens to an image surface of the camera optical lens along an optical axis.

Preferably, the camera optical lens further satisfies conditions of $-5.90 \leq f2/f \leq -0.91$, $-1.59 \leq (R3+R4)/(R3-R4) \leq 1.96$, and $0.03 \leq d3/TTL \leq 0.09$. Herein R3 denotes a curvature radius of an object-side surface of the second lens, R4 denotes a curvature radius of the image-side surface of the second lens, d3 denotes an on-axis thickness of the second lens.

Preferably, the camera optical lens further satisfies conditions of $-92.61 \leq f3/f \leq -9.93$, and $0.03 \leq d5/TTL \leq 0.11$. Herein f3 denotes a focal length of the third lens, d5 denotes an on-axis thickness of the third lens.

Preferably, the camera optical lens further satisfies conditions of $0.35 \leq f4/f \leq 1.35$, and $0.05 \leq d7/TTL \leq 0.21$. Herein f4 denotes a focal length of the fourth lens, and d7 denotes an on-axis thickness of the fourth lens L4.

Preferably, the camera optical lens further satisfies conditions of $-1.30 \leq f5/f \leq -0.37$, $0.13 \leq (R9+R10)/(R9-R10) \leq 1.00$, and $0.04 \leq d9/TTL \leq 0.13$. Herein f5 denotes a focal length of the fifth lens, and d9 denotes an on-axis thickness of the fifth lens.

Preferably, the camera optical lens further satisfies a condition of $TTL/IH \leq 1.36$. Herein IH denotes an image height of the camera optical lens.

Preferably, the camera optical lens further satisfies a condition of $FOV \geq 79.00°$. Herein FOV denotes an field of view of the camera optical lens.

Preferably, the camera optical lens according to claim 1 further satisfies a condition of $FNO \leq 2.05$. Herein FNO denotes an F number of the camera optical lens.

Advantageous effects of the present disclosure are that, the camera optical lens can meet design requirements of a large aperture, a wide angle and ultra-thin, and is especially suitable for a mobile camera lens component and a WEB camera lens composed of high pixel CCD, CMOS.

BRIEF DESCRIPTION OF DRAWINGS

To make the objectives, technical solutions, and advantages of the present disclosure clearer, embodiments of the present disclosure are described in detail with reference to accompanying drawings in the following. A person of ordinary skill in the art should understand that, in the embodiments of the present disclosure, many technical details are provided to make readers better understand the present disclosure. However, even without these technical details and any changes and modifications based on the following embodiments, technical solutions required to be protected by the present disclosure may be implemented.

DETAILED DESCRIPTION OF EMBODIMENTS

The following will further described the present disclosure in connection with the accompanying drawings and specific embodiments.

To make the objectives, technical solutions, and advantages of the present disclosure clearer, embodiments of the present disclosure are described in detail with reference to accompanying drawings in the following. A person of ordinary skill in the art should understand that, in the embodiments of the present disclosure, many technical details are provided to make readers better understand the present disclosure. However, even without these technical details and any changes and modifications based on the following embodiments, technical solutions required to be protected by the present disclosure may be implemented.

Embodiment 1

Figure 1:
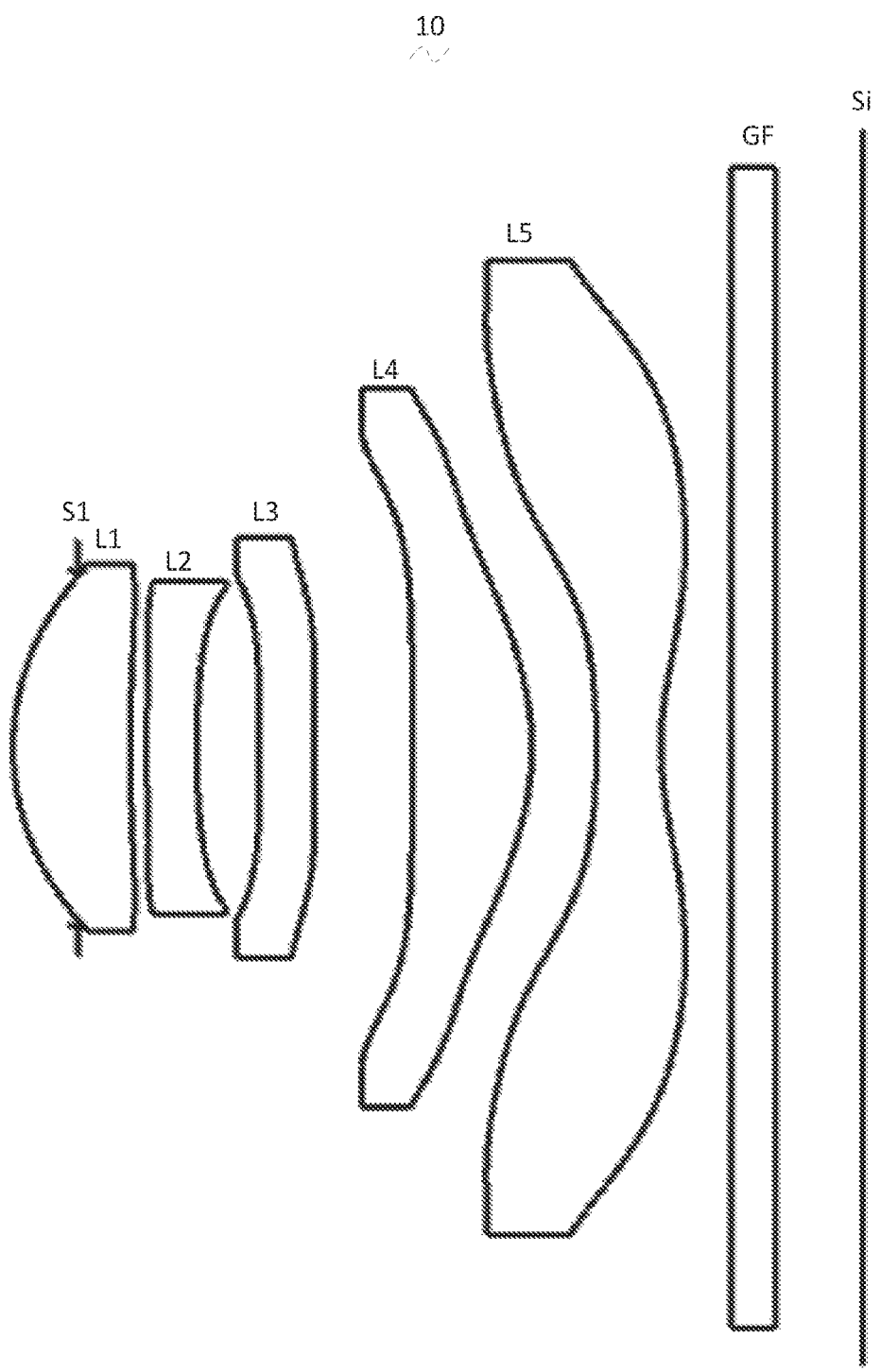
FIG. 1 shows a schematic diagram of a structure of a camera optical lens according to Embodiment 1 of the present disclosure.

Referring to FIG. 1 to FIG. 4, the present disclosure provides a camera optical lens 10. In FIG. 1, the left side is an object side, and the right side is an image side. The camera optical lens 10 includes five lenses, from the object side to the image side, an aperture Si, a first lens L1, a second lens L2, a third lens L3, a fourth lens L4 and a fifth lens L5. A glass plate (GF) such as a glass cover or an optical filter may be arranged between the fifth lens L5 and the image surface Si.

In the embodiment, the first lens L1 has a positive refractive power, the second lens L2 has a negative refractive power, the third lens L3 has a negative refractive power, the fourth lens L4 has a positive refractive power, and the fifth lens L5 has a negative refractive power.

In the embodiment, the first lens L1, the second lens L2, the third lens L3, the fourth lens L4 and the fifth lens L5 are all made of plastic material.

Herein, a focal length of the first lens L1 is defined as f1, a focal length of the second lens L2 is defined as f2, a curvature radius of an object-side surface of the third lens L3 is defined as R5, a curvature radius of an image-side surface of the third lens L3 is defined as R6, a curvature radius of an object-side surface of the fourth lens L4 is defined as R7, a curvature radius of an image-side surface of the fourth lens L4 is defined as R8, a curvature radius of an object-side surface of the fifth lens L5 is defined as R9, a curvature radius of an image-side surface of the fifth lens L5 is defined as R10, an on-axis distance from an image-side surface of the second lens L2 to the object-side surface of the third lens L3 is defined as d4, an on-axis distance from the image-side surface of the third lens L3 to the object-side surface of the fourth lens L4 is defined as d6, and the camera optical lens 10 should satisfy following conditions:

$$-3.50 \leq f2/f1 \leq -1.80 \tag{1}$$

$$1.00 \leq (R7+R8)/(R7-R8) \leq 1.75 \tag{2}$$

$$1.30 \leq d6/d4 \leq 2.00 \tag{3}$$

$$5.00 \leq (R5+R6)/(R5-R6) \leq 20.00 \tag{4}$$

$$-5.00 \leq /(R5-R6) \leq 20.0 \tag{5}$$

The above condition (1) stipulates a ratio of the focal length of the second lens L2 to the focal length of the first lens L1, within this range, it is beneficial to improve an image quality.

The above condition (2) stipulates a shape of the fourth lens L4, within this range, a degree of deflection of light passing through the lens can be alleviated, and aberrations can be reduced effectively.

The above condition (3) stipulates a ratio of d6/d4, within this range, a position of the third lens L3 can be effectively allocated, which is convenient for lenses assembly.

The above condition (4) stipulates a shape of the third lens L3, within this range, aberrations can be reduced effectively.

The above condition (5) stipulates a shape of the fifth lens L5, within this range, it is helpful for correcting a field curvature and improving the imaging quality.

An on-axis thickness of the first lens L1 is defined as d1, an on-axis distance from an image-side surface of the first lens L1 to an object-side surface of the second lens L2 is defined as d2, and the camera optical lens 10 satisfies a condition of $4.00 \leq d1/d2 \leq 8.00$. When d1/d2 meets the condition, it is beneficial to the processing and assembly of the first lens L1.

In the embodiment, an object-side surface of the first lens L1 is convex in a paraxial region, and the image-side surface of the first lens L1 is concave in the paraxial region.

A focal length of the camera optical lens 10 is defined as f, a focal length of the first lens L1 is defined as f1, and the camera optical lens 10 satisfies a condition of $0.37 \leq f1/f \leq 1.30$, which specifies a ratio of the focal length of the first lens L1 to the focal length of the camera optical lens 10. Whining this range, the first lens has a positive refractive power, which is beneficial to reduce system aberrations, and meanwhile, which is also beneficial to a development of ultra-thin and a wide angle lens. Preferably, the camera optical lens 10 further satisfies a condition of $0.59 \leq f1/f \leq 1.04$.

A curvature radius of the object-side surface of the first lens L1 is defined as R1, a curvature radius of the image-side surface of the first lens L1 is defined as R2, and the camera optical lens 10 satisfies a condition of $-3.10 \leq (R1+R2)/(R1-R2) \leq -0.71$. By reasonably controlling a shape of the first lens L1, so that the first lens L1 can effectively correct a spherical aberration of the system. Preferably, the camera optical lens 10 further satisfies a condition of $-1.94 \leq 1R1+R2)/(R1-R2) \leq -0.89$.

An on-axis thickness of the first lens L1 is defined as d1, a total optical length from the object-side surface of the first lens L1 to an image surface of the camera optical lens 10 along an optical axis is defined as TTL, and the camera optical lens 10 satisfies a condition of $0.06 \leq d1/TTL \leq 0.21$. Within this range, it is beneficial to achieve ultra-thin. Preferably, the camera optical lens 10 further satisfies a condition of $0.10 \leq d1/TTL \leq 0.16$.

In the embodiment, an object-side surface of the second lens L2 is convex in the paraxial region, and an image-side surface of the second lens L2 is concave in the paraxial region.

A focal length of the second lens L2 is defined as f2, and the camera optical lens 10 satisfies a condition of $-5.90 \leq f2/f \leq -0.91$. By controlling the focal length of the second lens L2 within a reasonably range, it is beneficial to correct aberrations of the system. Preferably, the camera optical lens 10 further satisfies a condition of $-3.69 \leq f2/f \leq -1.14$.

A curvature radius of the object-side surface of the second lens L2 is defined as R3, a curvature radius of the image-side surface of the second lens L2 is defined as R4, and the camera optical lens 10 satisfies condition of $-1.59 \leq (R3+R4)/(R3-R4) \leq 1.96$, which stipulates a shape of the second lens L2. Within this range, a development towards ultra-thin and a wide angle lenses would facilitate correcting a problem of an on-axis aberration. Preferably, the camera optical lens 10 further satisfies a condition of $1.00 \leq (R3+R4)/(R3-R4) \leq 1.57$.

An on-axis thickness of the second lens L2 is defined as d3, and the camera optical lens 10 satisfies a condition of $0.03 \leq d3/TTL \leq 0.09$. Within this range, it is beneficial to achieve ultra-thin. Preferably, the camera optical lens 10 further satisfies a condition of $0.05 \leq d3/TTL \leq 0.07$.

In the embodiment, the object-side surface of the third lens L3 is convex in the paraxial region, and the image-side surface of the third lens L3 is concave in the paraxial region.

A focal length of the third lens L3 is defined as f3, and the camera optical lens 10 satisfies a condition of $-92.61 \leq f3/f \leq -9.93$. By a reasonable distribution of the focal length, which makes the system has an excellent imaging quality and a lower sensitivity. Preferably, the camera optical lens 10 further satisfies a condition of $-57.88 \leq f3/f \leq -12.41$.

An on-axis thickness of the third lens L3 is defined as d5, the camera optical lens 10 satisfies a condition of $0.03 \leq d5/TTL \leq 0.11$. Within this range, it is beneficial to achieve ultra-thin. Preferably, the camera optical lens 10 further satisfies a condition of $0.05 \leq d5/TTL \leq 0.09$.

In the embodiment, the object-side surface of the fourth lens L4 is concave in the paraxial region, and the image-side surface of the fourth lens L4 is convex in the paraxial region.

A focal length of the fourth lens L4 is defined as f4, and the camera optical lens 10 satisfies a condition of $0.35 \leq f4/f \leq 1.35$. By a reasonable distribution of the focal length, which makes the system has an excellent imaging quality and a lower sensitivity. Preferably, the camera optical lens 10 further satisfies a condition of $0.57 \leq f4/f \leq 1.08$.

A curvature radius of the object-side surface of the fourth lens L4 is d7, and the camera optical lens 10 satisfies a condition of $0.05 \leq d7/TTL \leq 0.21$. Within this range, it is beneficial to achieve ultra-thin. Preferably, the camera optical lens 10 further satisfies a condition of $0.08 \leq d7/TTL \leq 0.17$.

In the embodiment, the object-side surface of the fifth lens L5 is convex in the paraxial region, and the image-side surface of the fifth lens L5 is convex in the paraxial region.

A focal length of the fifth lens L5 is defined as f5, and the camera optical lens 10 satisfies a condition of $-1.30 \leq f5/f \leq -0.37$. By a reasonable distribution of the focal length, this can effectively smooth light angle of the camera lens and reduce tolerance sensitivity. Preferably, the camera optical lens 10 further satisfies a condition of $-0.81 \leq f5/f \leq -0.46$.

Furthermore, the camera optical lens 10 satisfies a condition of $0.13 \leq (R9+R10)/(R9-R10) \leq 1.00$, which stipulates a shape of the fifth lens L5. Within this range, a development towards ultra-thin and a wide angle lenses would facilitate correcting a problem of an off-axis aberration. Preferably, the camera optical lens 10 further satisfies a condition of $0.21 \leq (R9+R10)/(R9-R10) \leq 0.80$.

An on-axis thickness of the fifth lens L5 is defined as d9, and the camera optical lens 10 satisfies a condition of $0.04 \leq d9/TTL \leq 0.13$. Within this range, it is beneficial to achieve ultra-thin. Preferably, the camera optical lens 10 further satisfies a condition of $0.06 \leq d9/TTL \leq 0.10$.

In the embodiment, an image height of the camera optical lens 10 is defined as IH, and the camera optical lens 10 satisfies a condition of $TTL/IH \leq 1.36$, which is beneficial to achieve ultra-thin.

In the embodiment, an field of view (FOV) the camera optical lens 10 is greater than or equal to 79.00°, thereby achieving a wide angle.

In the embodiment, an F number (FNO) of the camera optical lens 10 is defined as FNO, and the camera optical lens 10 satisfies a condition of $FNO \leq 2.05$, thereby facilitating to realization of a large aperture.

In the embodiment, a combined focal length of the first lens L1 and the second lens L2 is defined as f12, and the camera optical lens 10 further satisfies a condition of $0.57 \leq f12/f \leq 1.91$. Within this range, it can eliminate an aberration and a distortion of the camera optical lens and reduce a back focal length of the camera optical lens, thereby maintaining miniaturization of the camera optical lens. Preferably, the camera optical lens 10 further satisfies a condition of $0.92 \leq f12/f \leq 1.52$.

Furthermore, in the camera optical lens 10 of the present disclosure, a surface of each lens may be set as an aspherical surface, the aspherical surface may be easily made into a shape other than a spherical surface, so as to obtain more control variables to reduce aberrations, thereby reducing the number of lenses used, so that the total length of the imaging optical lens 10 can be effectively reduced. In the embodiment, the object-side surface and the image-side surface of each lens are aspherical.

It should be noted that, since the first lens L1, the second lens L2, the third lens L3, the fourth lens L4, and the fifth lens L5 have the structure and parameter relationship as described above, the imaging optical lens 10 can reasonably allocate the refractive power, spacing, a shape of each lens, and thereby correcting various aberrations.

Therefore, the imaging optical lens can achieve excellent optical performances, and meanwhile can meet design requirements of a large aperture, a wide angle and ultra-thin.

In the following, embodiments will be used to describe the camera optical lens 10 of the present disclosure. The symbols recorded in each embodiment will be described as follows. The focal length, on-axis distance, curvature radius, on-axis thickness, inflexion point position, and arrest point position are all in units of mm.

TTL: Optical length (the total optical length from the object-side surface of the first lens L1 to the image surface Si of the camera optical lens along the optical axis) in mm.

The F number (FNO) means a ratio of an effective focal length of the camera optical lens to an entrance pupil diameter (ENPD).

Furthermore, inflexion points and/or arrest points can be arranged on the object-side surface and the image-side surface of the lens, so as to satisfy the demand for high quality imaging. The description below can be referred for specific implementations.

Table 1 and Table 2 show design data of the camera optical lens 10 shown in FIG. 1.

Table 1 lists a curvature radius of the object-side surface and the image-side surface of each lens, an on-axis thickness of each lens and an on-axis distance between two adjacent lenses, a refractive index nd and an abbe number vd. It should be noted that in the embodiment, the units of R and d are in millimeters (mm).

TABLE 1

|     | R       | d    |        | nd  |        | vd |       |
|-----|---------|------|--------|-----|--------|----|-------|
| S1  | ∞       | d0 = | −0.297 |     |        |    |       |
| R1  | 1.218   | d1 = | 0.541  | nd1 | 1.5444 | v1 | 55.82 |
| R2  | 5.651   | d2 = | 0.079  |     |        |    |       |
| R3  | 28.003  | d3 = | 0.230  | nd2 | 1.6610 | v2 | 20.53 |
| R4  | 3.710   | d4 = | 0.287  |     |        |    |       |
| R5  | 12.398  | d5 = | 0.260  | nd3 | 1.6610 | v3 | 20.53 |
| R6  | 10.997  | d6 = | 0.455  |     |        |    |       |
| R7  | −30.924 | d7 = | 0.555  | nd4 | 1.5346 | v4 | 55.69 |
| R8  | −1.245  | d8 = | 0.299  |     |        |    |       |
| R9  | −4.091  | d9 = | 0.299  | nd5 | 1.5346 | v5 | 55.69 |
| R10 | 1.367   | d10 =| 0.324  |     |        |    |       |
| R11 | ∞       | d11 =| 0.210  | ndg | 1.5168 | vg | 64.17 |
| R12 | ∞       | d12 =| 0.402  |     |        |    |       |

Herein, meanings of various symbols will be described as follows.

Si: aperture.

R: curvature radius of an optical surface, a central curvature radius for a lens.

R1: curvature radius of the object-side surface of the first lens L1.

R2: curvature radius of the image-side surface of the first lens L1.

R3: curvature radius of the object-side surface of the second lens L2.

R4: curvature radius of the image-side surface of the second lens L2.

R5: curvature radius of the object-side surface of the third lens L3.

R6: curvature radius of the image-side surface of the third lens L3.

R7: curvature radius of the object-side surface of the fourth lens L4.

R8: curvature radius of the image-side surface of the fourth lens L4.

R9: curvature radius of the object-side surface of the fifth lens L5.

R10: curvature radius of the image-side surface of the fifth lens L5.

R11: curvature radius of an object-side surface of the optical filter (GF).

R12: curvature radius of an image-side surface of the optical filter (GF).

d: on-axis thickness of a lens and an on-axis distance between lens.

d0: on-axis distance from the aperture Si to the object-side surface of the first lens L1.

d1: on-axis thickness of the first lens L1.

d2: on-axis distance from the image-side surface of the first lens L1 to the object-side surface of the second lens L2.

d3: on-axis thickness of the second lens L2.

d4: on-axis distance from the image-side surface of the second lens L2 to the object-side surface of the third lens L3.

d5: on-axis thickness of the third lens L3.

d6: on-axis distance from the image-side surface of the third lens L3 to the object-side surface of the fourth lens L4.

d7: on-axis thickness of the fourth lens L4.

d8: on-axis distance from the image-side surface of the fourth lens L4 to the object-side surface of the fifth lens L5.

d9: on-axis thickness of the fifth lens L5.

d10: on-axis distance from the image-side surface of the fifth lens L5 to the object-side surface of the optical filter (GF).

d11: on-axis thickness of the optical filter (GF).

d12: on-axis distance from the image-side surface of the optical filter (GF) to the image surface Si.

nd: refractive index of a d line.

nd1: refractive index of the d line of the first lens L1.

nd2: refractive index of the d line of the second lens L2.

nd3: refractive index of the d line of the third lens L3.

nd4: refractive index of the d line of the fourth lens L4.

nd5: refractive index of the d line of the fifth lens L5.

ndg: refractive index of the d line of the optical filter (GF).

vd: abbe number.

v1: abbe number of the first lens L1.

v2: abbe number of the second lens L2.

v3: abbe number of the third lens L3.

v4: abbe number of the fourth lens L4.

v5: abbe number of the fifth lens L5.

vg: abbe number of the optical filter (GF).

Table 2 shows aspherical surface data of each lens of the camera optical lens 10 in Embodiment 1 of the present disclosure.

TABLE 2

|     | Conic coefficient | Aspheric surface coefficients | | | | |
|-----|---|---|---|---|---|---|
|     | k | A4 | A6 | A8 | A10 | A12 |
| R1  | 1.7394E−01  | −7.9282E−02 | 9.1224E−01  | −7.2670E+00 | 3.4339E+01  | −1.0273E+02 |
| R2  | 5.7525E−01  | −1.5979E−01 | 6.9004E−01  | −6.2876E+00 | 3.8601E+01  | −1.3765E+02 |
| R3  | −4.4594E+02 | −1.5083E−01 | 4.9319E−01  | −7.1813E−01 | 5.2452E+00  | −2.5828E+01 |
| R4  | 1.9137E+01  | −8.8365E−02 | 1.6803E−01  | 2.5266E+00  | −1.5572E+01 | 5.4127E+01  |
| R5  | 1.4856E+02  | −3.1804E−01 | −9.8868E−02 | 2.7055E−01  | −5.3787E−01 | 9.5345E+00  |
| R6  | 7.3170E+01  | −1.9568E−01 | −6.7419E−01 | 3.9313E+00  | −1.3356E+01 | 2.9655E+01  |
| R7  | 2.2121E+02  | 7.3745E−02  | −3.2505E−01 | 4.9286E−01  | −4.5322E−01 | 2.2744E−01  |
| R8  | −1.2076E+00 | 2.8008E−01  | −4.1597E−01 | 2.6304E−01  | 2.0292E−01  | −4.1180E−01 |
| R9  | −7.4069E+00 | −1.7169E−01 | −1.9499E−01 | 4.8369E−01  | −3.7199E−01 | 1.5422E−01  |
| R10 | −7.8475E+00 | −2.1786E−01 | 1.5509E−01  | −7.6352E−02 | 2.5941E−02  | −6.1259E−03 |

TABLE 2-continued

| | Conic coefficient | Aspheric surface coefficients | | | |
|---|---|---|---|---|---|
| | k | A14 | A16 | A18 | A20 |
| R1 | 1.7394E−01 | 1.9486E+02 | −2.2732E+02 | 1.4856E+02 | −4.1733E+01 |
| R2 | 5.7525E−01 | 2.9258E+02 | −3.6759E+02 | 2.5032E+02 | −7.0586E+01 |
| R3 | −4.4594E+02 | 6.7308E+01 | −9.9385E+01 | 7.8280E+01 | −2.5130E+01 |
| R4 | 1.9137E+01 | −1.1756E+02 | 1.5333E+02 | −1.0746E+02 | 3.0740E+01 |
| R5 | 1.4856E+02 | −5.1219E+01 | 1.1810E+02 | −1.2555E+02 | 5.0055E+01 |
| R6 | 7.3170E+01 | −4.2847E+01 | 3.9223E+01 | −2.0556E+01 | 4.6572E+00 |
| R7 | 2.2121E+02 | −5.2207E−02 | 7.6202E−04 | 1.7572E−03 | −2.1925E−04 |
| R8 | −1.2076E+00 | 2.6605E−01 | −8.7292E−02 | 1.4695E−02 | −1.0082E−03 |
| R9 | −7.4069E+00 | −3.8277E−02 | 5.7044E−03 | −4.7178E−04 | 1.6655E−05 |
| R10 | −7.8475E+00 | 9.6114E−04 | −9.3010E−05 | 4.9702E−06 | −1.1179E−07 |

IH: image height.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (6).$$

Herein, x is a vertical distance between a point on an aspheric curve and the optical axis, and y is a depth of the aspheric surface (the vertical distance between the point x from the optical axis on the aspheric surface and a tangent plane tangent to a vertex on the optical axis of the aspheric surface).

For convenience, an aspheric surface of each lens surface uses the aspheric surfaces shown in the above condition (6). However, the present disclosure is not limited to the aspherical polynomials form shown in the condition (6).

Table 3 and Table 4 show design data of inflexion points and arrest points of the camera optical lens 10 according to Embodiment 1 of the present disclosure. Herein P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optical axis of the camera optical lens 10. The data in the column named "arrest point position" refer to vertical distances from arrest points arranged on each lens surface to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 0.815 | / | / |
| P1R2 | 1 | 0.515 | / | / |
| P2R1 | 2 | 0.155 | 0.355 | / |
| P2R2 | 0 | / | / | / |
| P3R1 | 1 | 0.155 | / | / |
| P3R2 | 2 | 0.185 | 0.835 | / |
| P4R1 | 1 | 1.285 | / | / |
| P4R2 | 3 | 0.825 | 1.195 | 1.605 |
| P5R1 | 1 | 0.965 | / | / |
| P5R2 | 2 | 0.425 | 2.115 | / |

TABLE 4

| | Number of arrest points | Arrest point position 1 |
|---|---|---|
| P1R1 | 0 | / |
| P1R2 | 1 | 0.715 |
| P2R1 | 0 | / |
| P2R2 | 0 | / |
| P3R1 | 1 | 0.255 |
| P3R2 | 1 | 0.315 |
| P4R1 | 0 | / |
| P4R2 | 0 | / |
| P5R1 | 1 | 2.025 |
| P5R2 | 1 | 0.965 |

Figure 2:
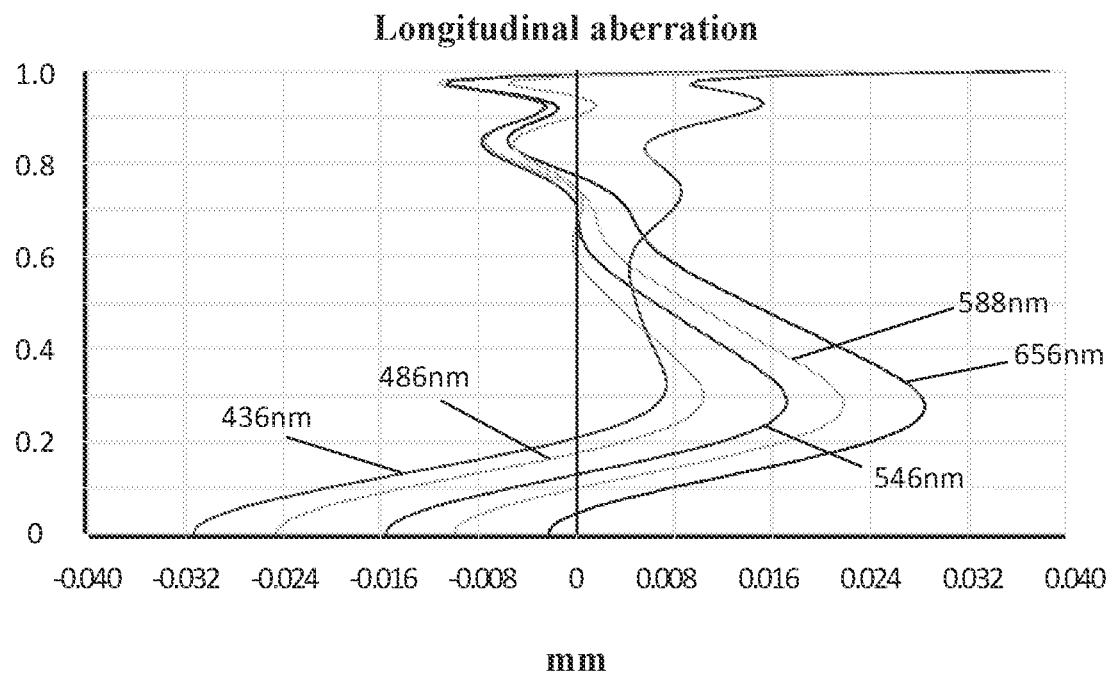
FIG. 2 is a schematic diagram of a longitudinal aberration of the camera optical lens shown in FIG. 1.
Figure 3:
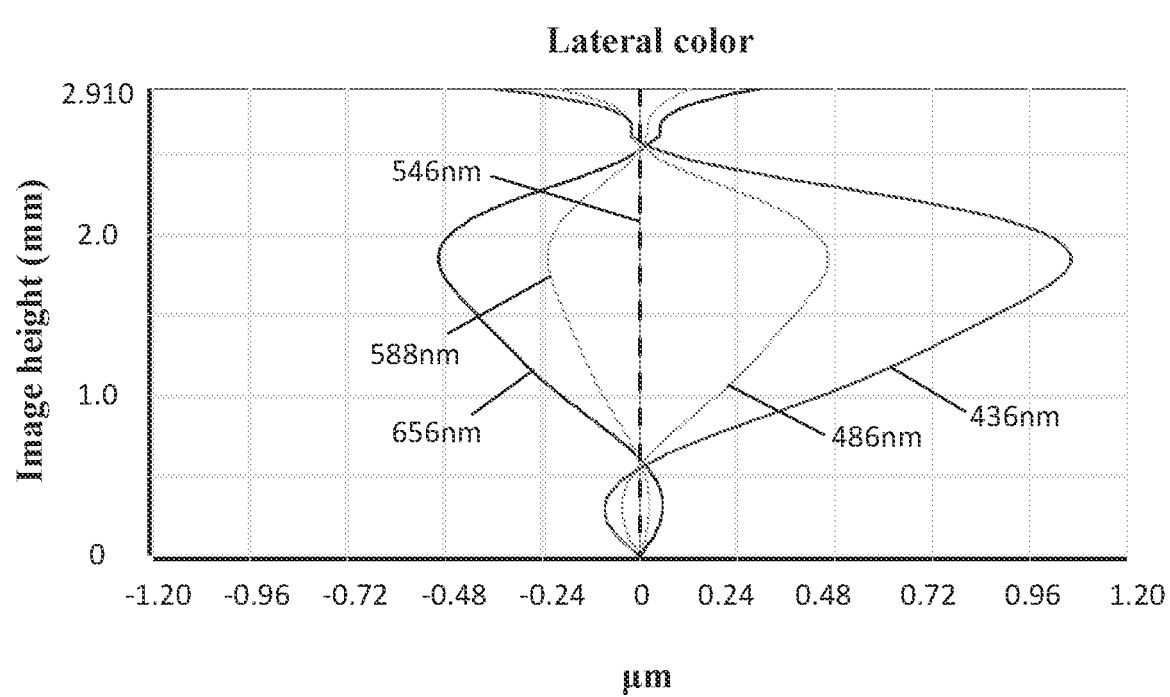
FIG. 3 shows a schematic diagram of a lateral color of the camera optical lens shown in FIG. 1.
Figure 4:
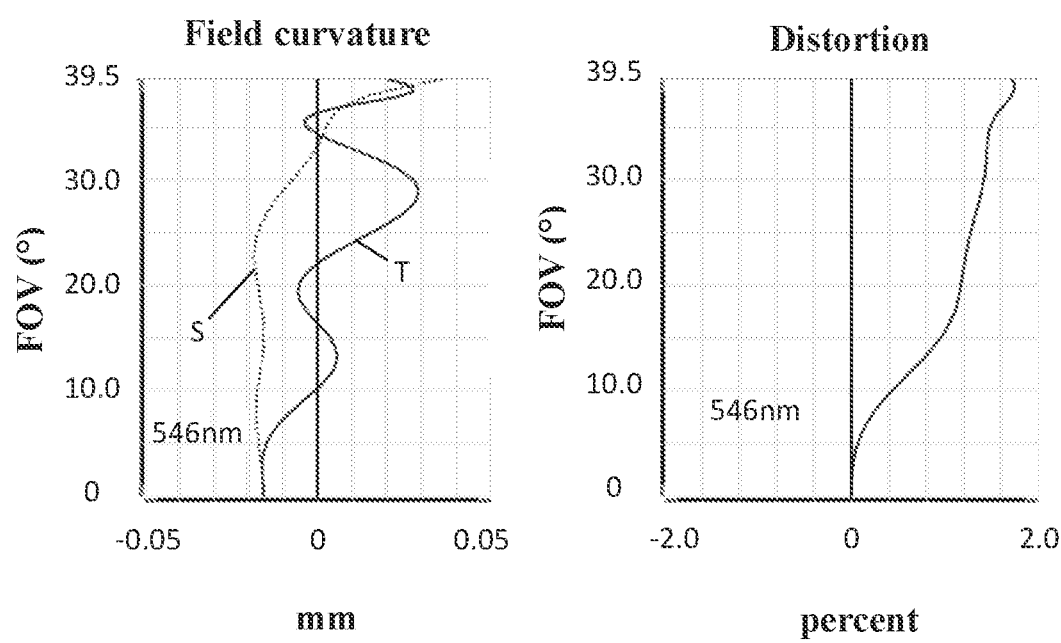
FIG. 4 shows a schematic diagram of a field curvature and a distortion of the camera optical lens shown in FIG. 1.

FIG. 2 and FIG. 3 illustrate a longitudinal aberration and a lateral color with wavelengths of 656 nm, 588 nm, 546 nm, 486 nm and 436 nm after passing the camera optical lens 10 according to Embodiment 1, respectively. FIG. 4 illustrates a field curvature and a distortion with a wavelength of 546 nm after passing the camera optical lens 10 according to Embodiment 1. A field curvature S in FIG. 4 is a field curvature in a sagittal direction, and T is a field curvature in a tangential direction.

In the embodiment, an entrance pupil diameter (ENPD) of the camera optical lens 10 is 1.673 mm, an image height IH of 1.0H is 2.910 mm, an FOV (field of view) in a diagonal direction is 79.00°. Thus, the camera optical lens can meet the design requirements of a large aperture, a wide angle and ultra-thin, and its on-axis and off-axis chromatic aberrations are fully corrected, thereby achieving excellent optical characteristics.

Embodiment 2

Figure 5:
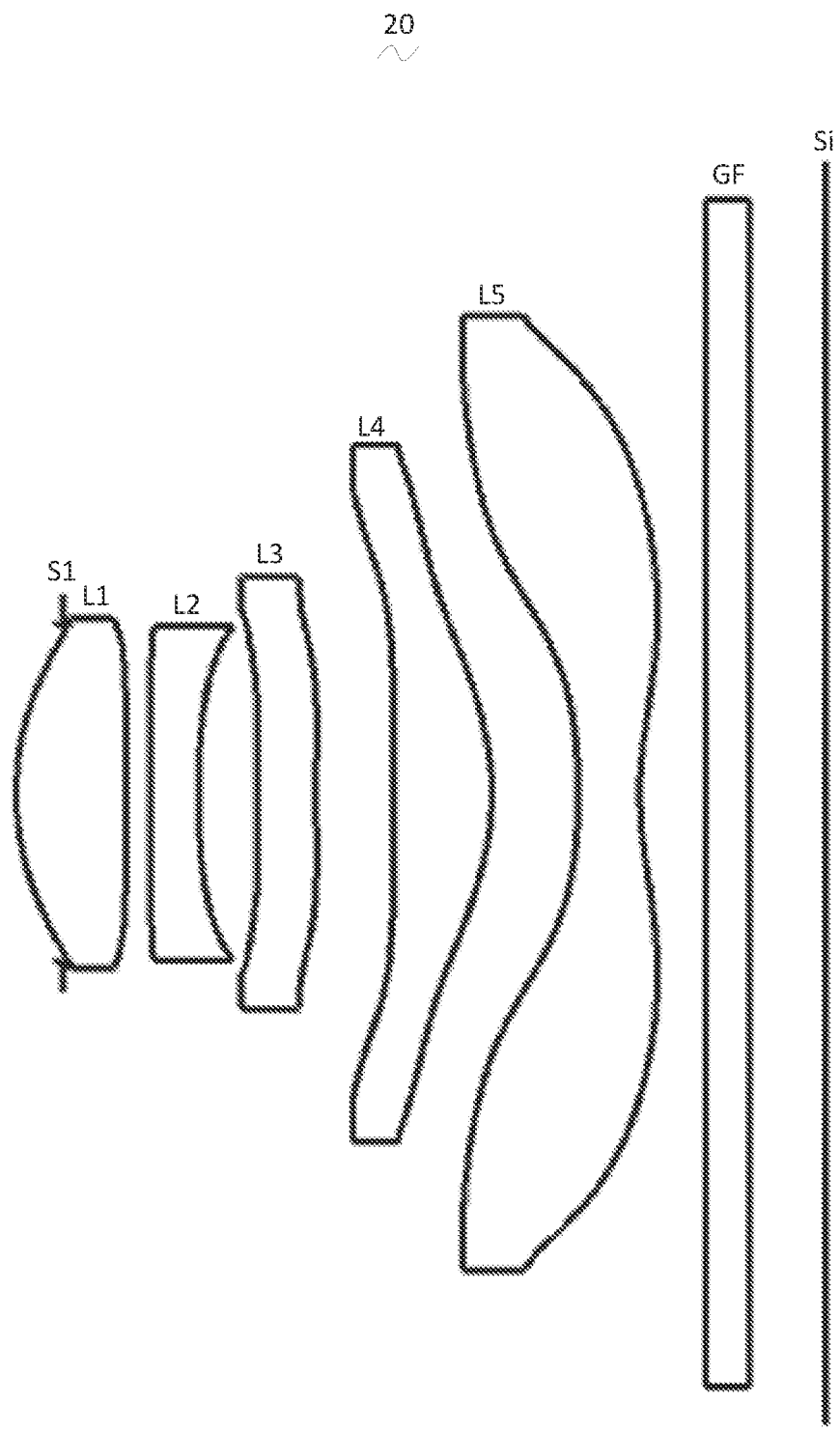
FIG. 5 shows a schematic diagram of a structure of a camera optical lens according to Embodiment 2 of the present disclosure.

FIG. 5 shows a schematic diagram of a structure of a camera optical lens according to Embodiment 2 of the present disclosure. Embodiment 2 is basically the same as Embodiment 1 and involves symbols having the same meanings as Embodiment 1, so the same parts will not be repeated here, and only differences therebetween will be described in the following.

In the embodiment, an object-side surface of the second lens L2 is concave in a paraxial region.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0 = | −0.229 | | | | |
| R1 | 1.340 | d1 = | 0.533 | nd1 | 1.5444 | v1 | 55.82 |

TABLE 5-continued

| | R | d | | nd | | vd |
|---|---|---|---|---|---|---|
| R2 | 44.266 | d2 = | 0.124 | | | |
| R3 | −23.376 | d3 = | 0.230 | nd2 | 1.6610 | v2 20.53 |
| R4 | 3.571 | d4 = | 0.287 | | | |
| R5 | 9.667 | d5 = | 0.286 | nd3 | 1.6610 | v3 20.53 |
| R6 | 8.742 | d6 = | 0.378 | | | |
| R7 | −50.633 | d7 = | 0.478 | nd4 | 1.5346 | v4 55.69 |
| R8 | −1.310 | d8 = | 0.420 | | | |
| R9 | −2.951 | d9 = | 0.300 | nd5 | 1.5346 | v5 55.69 |
| R10 | 1.733 | d10 = | 0.320 | | | |
| R11 | ∞ | d11 = | 0.210 | ndg | 1.5168 | vg 64.17 |
| R12 | ∞ | d12 = | 0.374 | | | |

Table 6 shows aspherical surface data of each lens of the camera optical lens 20 in Embodiment 2 of the present disclosure.

TABLE 6

| | Conic coefficient | Aspheric surface coefficients | | |
|---|---|---|---|---|
| | k | A4 | A6 | A8 |
| R1 | −7.8382E−02 | −1.4040E−01 | 1.1945E+00 | −6.5616E+00 |
| R2 | 9.0024E+01 | −5.5575E−02 | −1.1793E−01 | 6.0030E−01 |
| R3 | −9.0098E+01 | −3.7578E−02 | 2.9428E−01 | 7.0767E−01 |
| R4 | 1.6807E+01 | −3.5553E−01 | 5.4051E+00 | −4.5767E+01 |
| R5 | 8.9999E+01 | −3.0154E−01 | −8.3878E−01 | 1.0829E+01 |
| R6 | 5.9294E+01 | −3.8566E−01 | 1.0450E+00 | −4.4133E+00 |
| R7 | −9.0011E+01 | −1.0743E−02 | 1.2230E+00 | −7.6476E−01 |
| R8 | −1.2472E+00 | 2.1211E−01 | −2.9256E−01 | 2.0110E−01 |
| R9 | −8.8712E+00 | −1.7668E−01 | −1.8178E−01 | 4.6245E−01 |
| R10 | −6.7056E+00 | −2.3636E−01 | 1.6237E−01 | −7.6722E−02 |

| | Conic coefficient | Aspheric surface coefficients | | |
|---|---|---|---|---|
| | k | A10 | A12 | A14 |
| R1 | −7.8382E−02 | 2.0473E+01 | −3.8247E+01 | 4.1203E+01 |
| R2 | 9.0024E+01 | −1.4891E+00 | 1.3154E+00 | −4.3511E−01 |
| R3 | −9.0098E+01 | −5.7720E+00 | 1.4411E+00 | −1.7475E+01 |
| R4 | 1.6807E+01 | 2.4748E+02 | −8.4000E+02 | 1.7843E+03 |
| R5 | 8.9999E+01 | −5.9492E+01 | 1.9170E+02 | −3.7748E+02 |
| R6 | 5.9294E+01 | 1.1766E+00 | −1.8448E+01 | 1.5616E+01 |
| R7 | −9.0011E+01 | 1.6882E+00 | −2.0916E+00 | 1.5302E+00 |
| R8 | −1.2472E+00 | 1.7135E−01 | −3.6262E−01 | 2.4376E−01 |
| R9 | −8.8712E+00 | −3.5292E−01 | 1.4461E−01 | −3.5404E−02 |
| R10 | −6.7056E+00 | 2.5726E−02 | −6.0282E−03 | 9.0906E−04 |

| | Conic coefficient | Aspheric surface coefficients | | |
|---|---|---|---|---|
| | k | A16 | A18 | A20 |
| R1 | −7.8382E−02 | −2.3369E+01 | 5.1440E+00 | 0.0000E+00 |
| R2 | 9.0024E+01 | 0.0000E+00 | 0.0000E+00 | 0.0000E+00 |
| R3 | −9.0098E+01 | 8.5131E+00 | 0.0000E+00 | 0.0000E+00 |
| R4 | 1.6807E+01 | −2.3007E+03 | 1.6438E+03 | −4.9894E+02 |
| R5 | 8.9999E+01 | 4.4725E+02 | −2.9152E+02 | 7.9614E+01 |
| R6 | 5.9294E+01 | −4.5239E+00 | −2.0144E+00 | 1.1980E+00 |
| R7 | −9.0011E+01 | −6.4791E−01 | 1.4645E−01 | −1.3667E−02 |
| R8 | −1.2472E+00 | −8.2476E−02 | 1.4194E−02 | −9.8830E−04 |
| R9 | −8.8712E+00 | 5.1918E−03 | −4.2110E−04 | 1.4518E−05 |
| R10 | −6.7056E+00 | −7.5922E−05 | 2.1141E−06 | 7.4461E−08 |

Table 7 and table 8 show design data of inflexion points and arrest points of each lens of the camera optical lens 20 lens according to Embodiment 2 of the present disclosure.

TABLE 7

| | Number of inflexion points | Inflexion point position 1 | Inflexion point position 2 | Inflexion point position 3 | Inflexion point position 4 |
|---|---|---|---|---|---|
| P1R1 | 1 | 0.735 | / | / | / |
| P1R2 | 1 | 0.175 | / | / | / |
| P2R1 | 1 | 0.315 | / | / | / |
| P2R2 | 0 | / | / | / | / |
| P3R1 | 3 | 0.175 | 0.725 | 0.785 | / |
| P3R2 | 4 | 0.185 | 0.805 | 0.985 | 1.015 |
| P4R1 | 2 | 1.185 | 1.535 | / | / |
| P4R2 | 3 | 0.785 | 1.285 | 1.635 | / |
| P5R1 | 2 | 0.965 | 2.155 | / | / |
| P5R2 | 2 | 0.425 | 2.225 | / | / |

TABLE 8

| | Number of arrest points | Arrest point position 1 | Arrest point position 2 |
|---|---|---|---|
| P1R1 | 0 | / | / |
| P1R2 | 1 | 0.295 | / |
| P2R1 | 1 | 0.465 | / |
| P2R2 | 0 | / | / |
| P3R1 | 1 | 0.295 | / |
| P3R2 | 2 | 0.315 | 1.055 |
| P4R1 | 0 | / | / |
| P4R2 | 0 | / | / |
| P5R1 | 1 | 2.105 | / |
| P5R2 | 1 | 0.895 | / |

Figure 6:
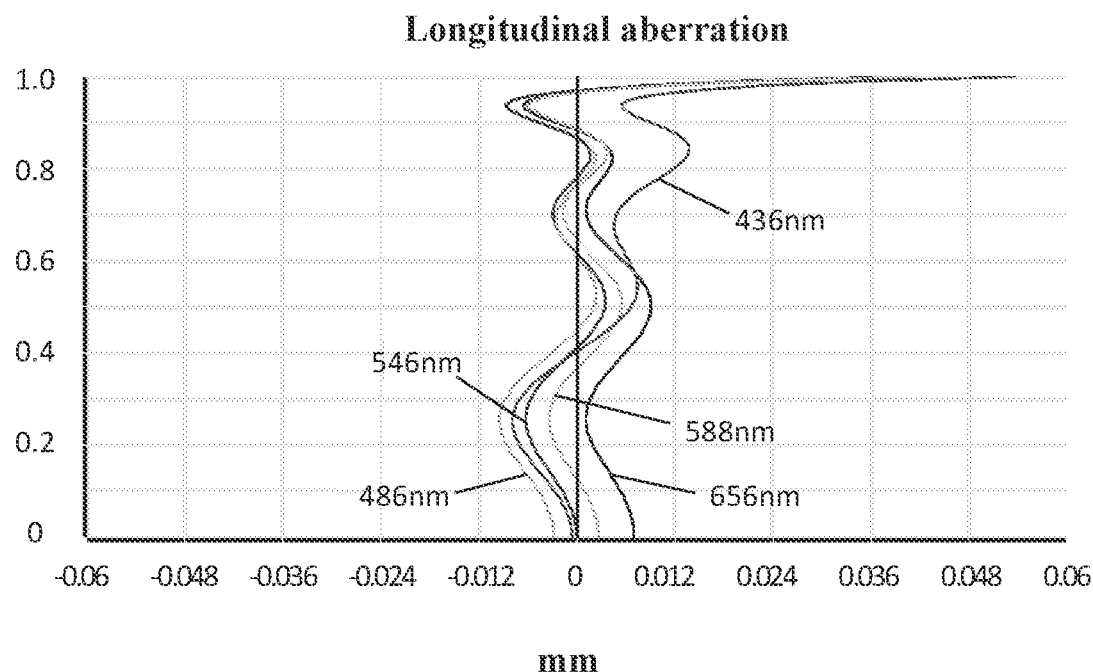
FIG. 6 shows a schematic diagram of a longitudinal aberration of the camera optical lens shown in FIG. 5.
Figure 7:
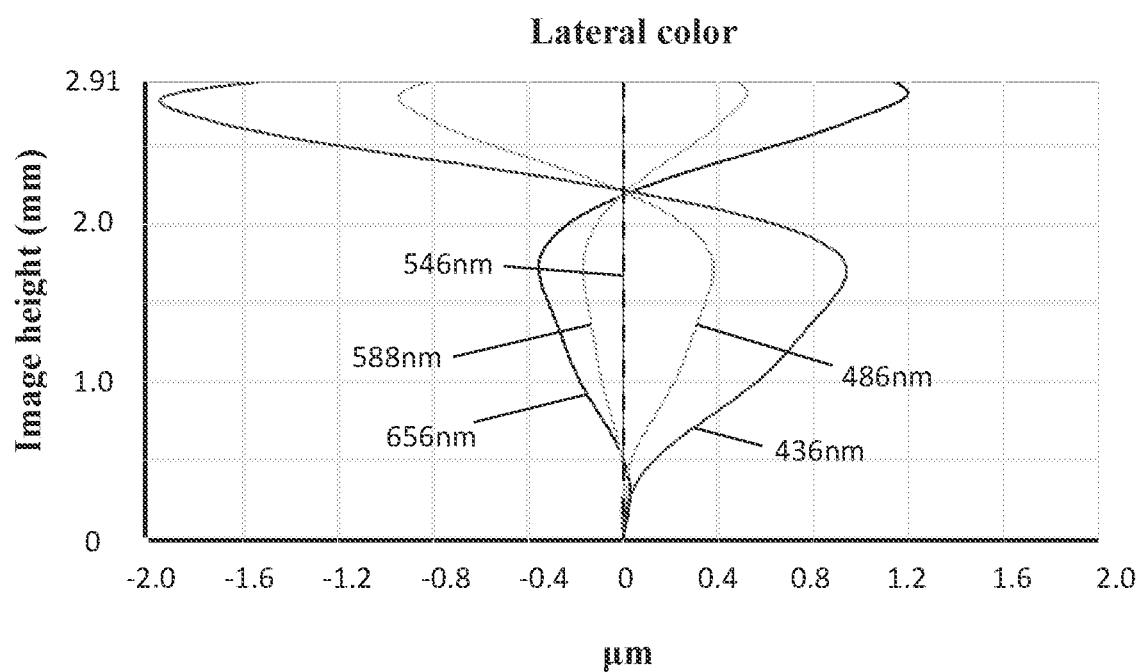
FIG. 7 shows a schematic diagram of a lateral color of the camera optical lens shown in FIG. 5.
Figure 8:
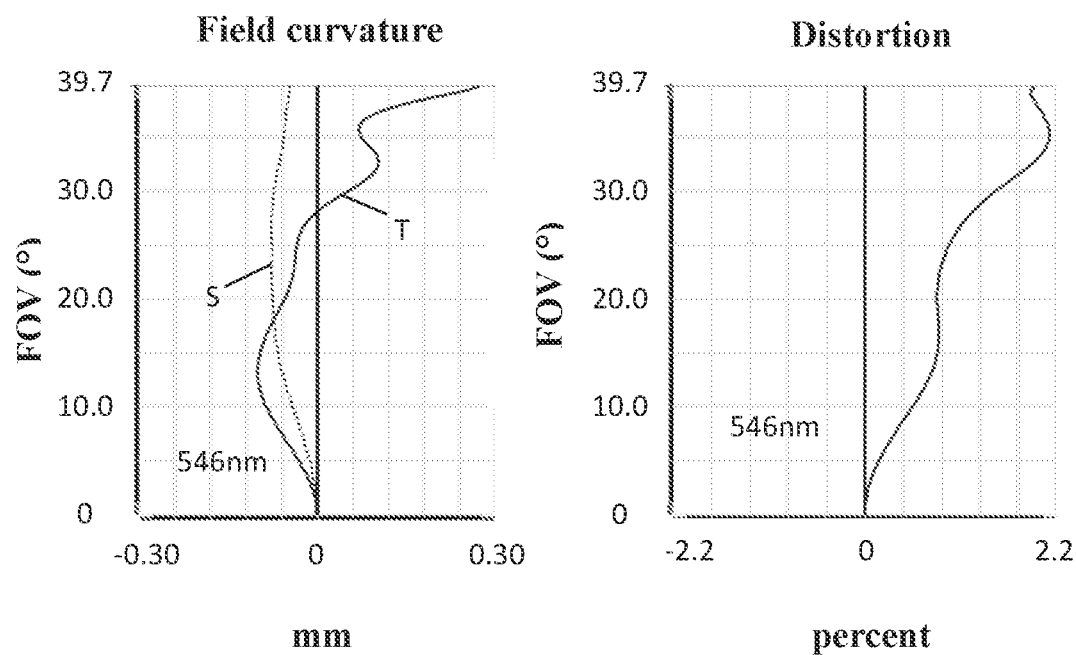
FIG. 8 shows a schematic diagram of a field curvature and a distortion of the camera optical lens shown in FIG. 5.

FIG. 6 and FIG. 7 illustrate a longitudinal aberration and a lateral color with wavelengths of 656 nm, 588 nm, 546 nm, 486 nm and 436 nm after passing the camera optical lens 20 according to Embodiment 2, respectively. FIG. 8 illustrates a field curvature and a distortion with a wavelength of 546 nm after passing the camera optical lens 20 according to Embodiment 2.

In the embodiment, an entrance pupil diameter (ENPD) of the camera optical lens 20 is 1.670 mm, an image height IH of 1.0 H is 2.910 mm, an FOV (field of view) in the diagonal direction is 79.400. Thus, the camera optical lens can meet the design requirements of a large aperture, a wide angle and ultra-thin, and its on-axis and off-axis chromatic aberrations are fully corrected, thereby achieving excellent optical characteristics.

Embodiment 3

Figure 9:
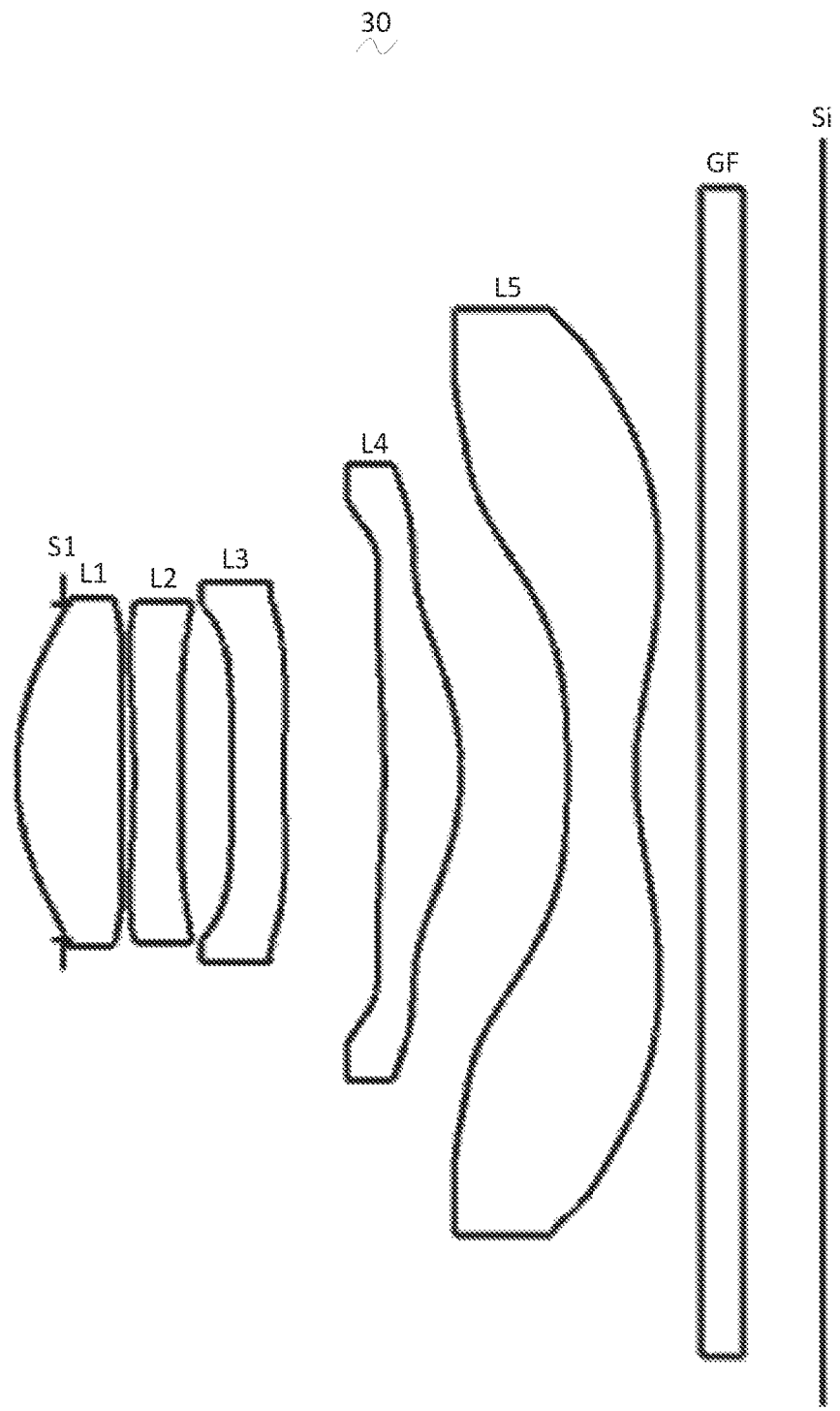
FIG. 9 shows a schematic diagram of a structure of a camera optical lens according to Embodiment 3 of the present disclosure.

FIG. 9 shows a schematic diagram of a structure of a camera optical lens 30 according to Embodiment 3 of the present disclosure. Embodiment 3 is basically the same as Embodiment 1 and involves symbols having the same meanings as Embodiment 1, so the same parts will not be repeated here, and only differences therebetween will be described in the following.

In the embodiment, an object-side surface of the second lens L2 is concave in a paraxial region.

Table 9 and Table 10 show design data of a camera optical lens 30 in Embodiment 3 of the present disclosure.

TABLE 9

| | R | d | | nd | vd |
|---|---|---|---|---|---|
| S1 | ∞ | d0 = | −0.224 | | |
| R1 | 1.340 | d1 = | 0.508 | nd1 1.5444 | v1 55.82 |
| R2 | 7.124 | d2 = | 0.064 | | |
| R3 | −7.448 | d3 = | 0.230 | nd2 1.6610 | v2 20.53 |

TABLE 9-continued

| | R | d | | nd | | vd |
|---|---|---|---|---|---|---|
| R4 | 65.904 | d4 = | 0.245 | | | |
| R5 | 16.211 | d5 = | 0.260 | nd3 | 1.6610 | v3 20.53 |
| R6 | 10.882 | d6 = | 0.486 | | | |
| R7 | -4.695 | d7 = | 0.377 | nd4 | 1.5346 | v4 55.69 |
| R8 | -1.251 | d8 = | 0.520 | | | |
| R9 | -7.165 | d9 = | 0.332 | nd5 | 1.5346 | v5 55.69 |
| R10 | 1.440 | d10 = | 0.320 | | | |
| R11 | ∞ | d11 = | 0.210 | ndg | 1.5168 | vg 64.17 |
| R12 | ∞ | d12 = | 0.389 | | | |

Table 10 shows aspherical surface data of each lens of the camera optical lens 30 in Embodiment 3 of the present disclosure.

TABLE 10

| | Conic coefficient | Aspherical surface coefficients | | | | |
|---|---|---|---|---|---|---|
| | k | A4 | A6 | A8 | A10 | A12 |
| R1 | -2.3796E-01 | -6.0531E-02 | 4.6574E-01 | -2.5889E+00 | 8.2790E+00 | -1.7745E+01 |
| R2 | 1.2040E+01 | -2.7092E-01 | 6.3312E-01 | -1.8171E+00 | 4.1897E+00 | -5.8474E+00 |
| R3 | -8.8853E+01 | -2.4855E-01 | 1.7898E+00 | -6.5485E+00 | 1.7401E+01 | -2.7590E+01 |
| R4 | -8.9855E+01 | 5.3332E-02 | -8.2091E-01 | 1.4514E+01 | -9.3344E+01 | 3.3739E+02 |
| R5 | 4.8765E+01 | -5.1426E-02 | -3.3395E+00 | 2.7717E+01 | -1.4207E+02 | 4.4643E+02 |
| R6 | 8.1366E+00 | -8.8737E-02 | -4.6571E-01 | 3.8937E-01 | 5.0213E+00 | -2.7104E+01 |
| R7 | -4.3914E+01 | 1.5658E-01 | -5.0942E-01 | 1.1210E+00 | -9.6544E-01 | -4.8021E-01 |
| R8 | -1.1029E+00 | 1.9243E-01 | -1.6433E-01 | 3.5186E-02 | 6.0539E-01 | -9.4884E-01 |
| R9 | 1.1616E+01 | -3.1322E-01 | 1.9356E-01 | 2.4306E-03 | -1.2186E-01 | 1.2520E-01 |
| R10 | -8.7998E+00 | -1.8691E-01 | 1.3356E-01 | -5.5302E-02 | -4.6094E-04 | 1.3149E-02 |

| | Conic coefficient | Aspherical surface coefficients | | | |
|---|---|---|---|---|---|
| | k | A14 | A16 | A18 | A20 |
| R1 | -2.3796E-01 | 2.4129E+01 | -1.9121E+01 | 6.5458E+00 | 0.0000E+00 |
| R2 | 1.2040E+01 | 3.1128E+00 | 0.0000E+00 | 0.0000E+00 | 0.0000E+00 |
| R3 | -8.8853E+01 | 2.2360E+01 | -6.8876E+00 | 0.0000E+00 | 0.0000E+00 |
| R4 | -8.9855E+01 | -7.3354E+02 | 9.4693E+02 | -6.6881E+02 | 1.9910E+02 |
| R5 | 4.8765E+01 | -8.5789E+02 | 9.6651E+02 | -5.7328E+02 | 1.3327E+02 |
| R6 | 8.1366E+00 | 6.6233E+01 | -8.8360E+01 | 6.2314E+01 | -1.8066E+01 |
| R7 | -4.3914E+01 | 1.8112E+00 | -1.6550E+00 | 6.7880E-01 | -1.0623E-01 |
| R8 | -1.1029E+00 | 6.2074E-01 | -2.0763E-01 | 3.5045E-02 | -2.3702E-03 |
| R9 | 1.1616E+01 | -6.1482E-02 | 1.6052E-02 | -2.1427E-03 | 1.1528E-04 |
| R10 | -8.7998E+00 | -6.8721E-03 | 1.6976E-03 | -2.1029E-04 | 1.0448E-05 |

Table 11 and Table 12 show design data inflexion points and arrest points of the respective lenses in the camera optical lens 30 according to Embodiment 3 of the present disclosure.

TABLE 11

| | Number of inflexion points | Inflexion point position 1 | Inflexion point position 2 | Inflexion point position 3 | Inflexion point position 4 |
|---|---|---|---|---|---|
| P1R1 | 1 | 0.715 | / | / | / |
| P1R2 | 2 | 0.245 | 0.845 | / | / |
| P2R1 | 1 | 0.405 | / | / | / |
| P2R2 | 1 | 0.745 | / | / | / |
| P3R1 | 1 | 0.165 | / | / | / |
| P3R2 | 2 | 0.235 | 0.815 | / | / |
| P4R1 | 4 | 0.465 | 0.895 | 1.245 | 1.315 |
| P4R2 | 2 | 0.635 | 1.095 | / | / |
| P5R1 | 4 | 1.095 | 1.605 | 1.745 | 1.905 |
| P5R2 | 2 | 0.445 | 2.225 | / | / |

TABLE 12

| | Number of arrest points | Arrest point position 1 | Arrest point position 2 |
|---|---|---|---|
| P1R1 | 0 | / | / |
| P1R2 | 1 | 0.475 | / |
| P2R1 | 1 | 0.605 | / |
| P2R2 | 0 | / | / |
| P3R1 | 1 | 0.265 | / |
| P3R2 | 2 | 0.385 | 0.915 |
| P4R1 | 2 | 0.795 | 0.965 |
| P4R2 | 0 | / | / |
| P5R1 | 0 | / | / |
| P5R2 | 1 | 1.025 | / |

Figure 10:
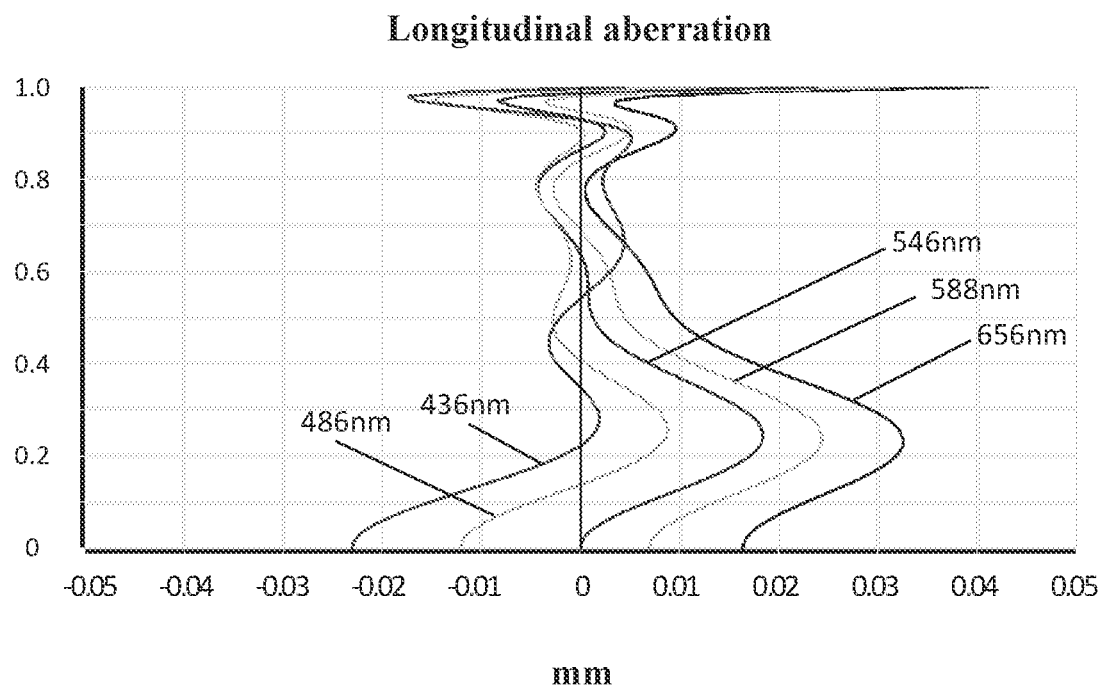
FIG. 10 shows a schematic diagram of a longitudinal aberration of the camera optical lens shown in FIG. 9.
Figure 11:
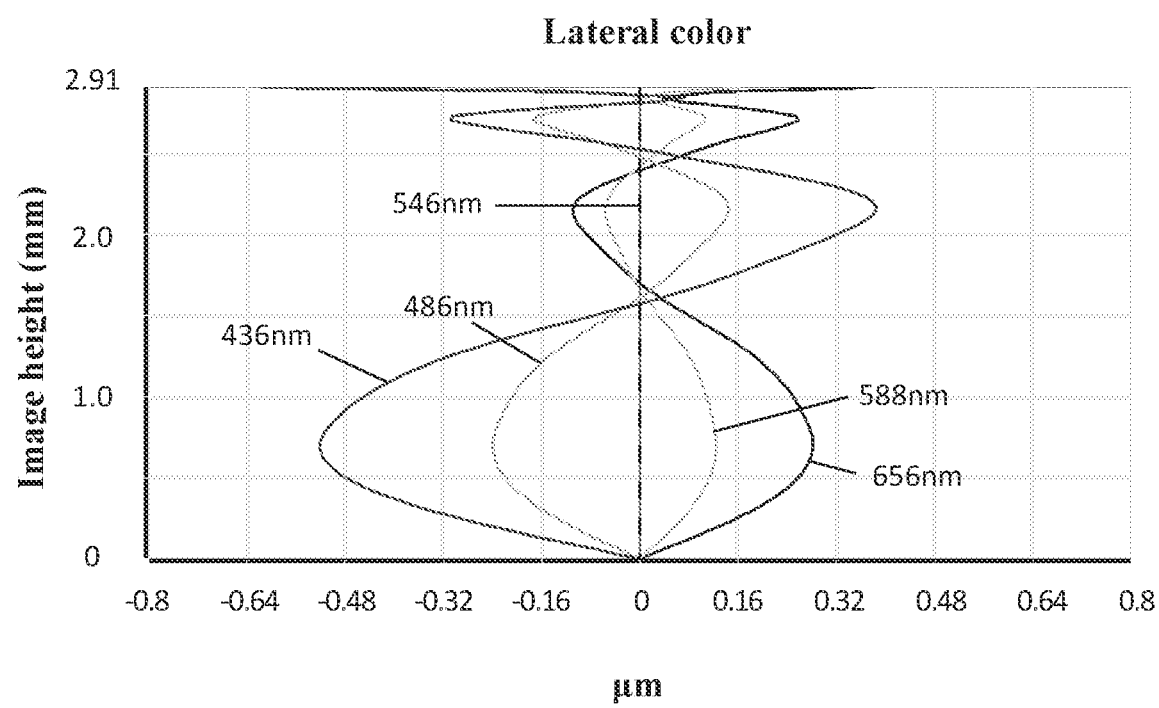
FIG. 11 shows a schematic diagram of a lateral color of the camera optical lens shown in FIG. 9.
Figure 12:
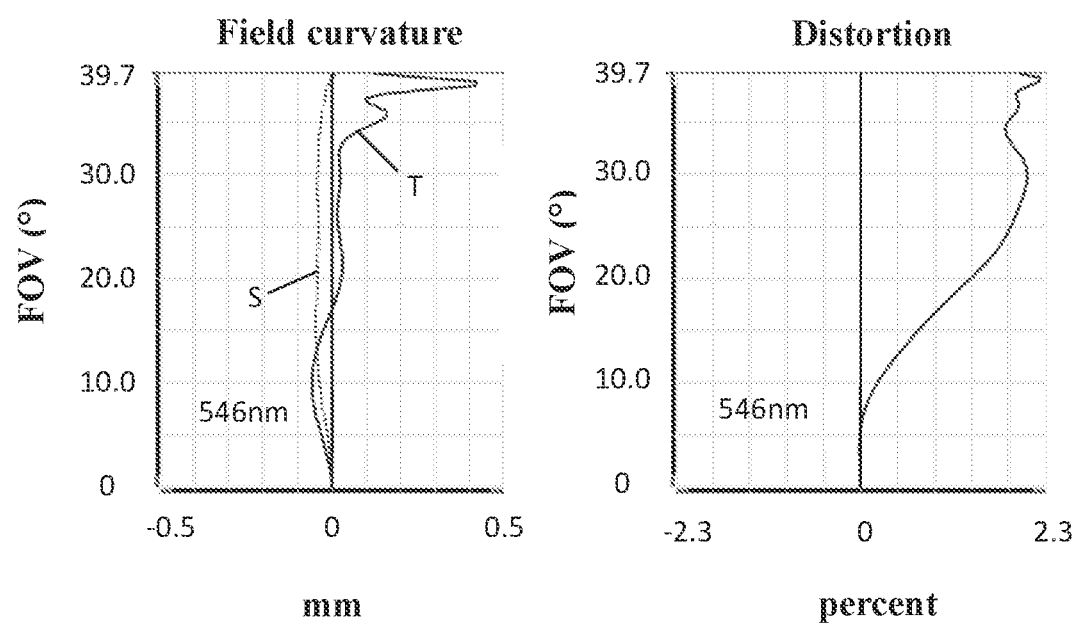
FIG. 12 shows a schematic diagram of a field curvature and a distortion of the camera optical lens shown in FIG. 9.

FIG. 10 and FIG. 11 illustrate a longitudinal aberration and a lateral color of light with wavelengths of 656 nm, 588 nm, 546 nm, 486 nm and 436 nm after passing the camera optical lens 30 according to Embodiment 3. FIG. 12 illustrates a field curvature and a distortion of light with a wavelength of 546 nm after passing the camera optical lens 30 according to Embodiment 3.

In the embodiment, an entrance pupil diameter (ENPD) of the camera optical lens 30 is 1.670 mm, an image height IH of 1.0 H is 2.910 mm, an FOV (field of view) in the diagonal direction is 79.40°. The camera optical lens can meet the design requirements of a large aperture, a wide angle and ultra-thin, and its on-axis and off-axis chromatic aberrations are fully corrected, thereby achieving excellent optical characteristics.

Table 13 in the following shows various values of Embodiment 1, Embodiment 2 and Embodiment 3, and also values corresponding to parameters which are specified in the above conditions.

TABLE 13

| Parameters and conditions | Embodiment 1 | Embodiment 2 | Embodiment 3 |
|---|---|---|---|
| f2/f1 | −2.36 | −1.84 | −3.41 |
| (R7 + R8)/(R7 − R8) | 1.08 | 1.05 | 1.73 |
| d6/d4 | 1.59 | 1.32 | 1.98 |
| (R5 + R6)/(R5 − R6) | 16.70 | 19.90 | 5.08 |
| R9/R10 | −2.99 | −1.70 | −4.98 |
| f | 3.396 | 3.390 | 3.390 |
| f1 | 2.722 | 2.516 | 2.928 |
| f2 | −6.421 | −4.618 | −9.997 |
| f3 | −157.245 | −156.022 | −50.496 |
| f4 | 2.400 | 2.497 | 3.060 |
| f5 | −1.873 | −1.989 | −2.204 |
| f12 | 4.003 | 4.306 | 3.883 |
| FNO | 2.03 | 2.03 | 2.03 |
| TTL | 3.941 | 3.940 | 3.941 |
| IH | 2.910 | 2.910 | 2.910 |
| FOV | 79.00° | 79.40° | 79.40° |

The above is only illustrates some embodiments of the present disclosure, in practice, one having ordinary skill in the art can make various modifications to these embodiments in forms and details without departing from the scope of the present disclosure.

What is claimed is:

1. A camera optical lens comprising five-piece lenses, from an object side to an image side, the five-piece lenses are:
  a first lens having a positive refractive power;
  a second lens having a negative refractive power;
  a third lens having a negative refractive power;
  a fourth lens having a positive refractive power; and
  a fifth lens having a negative refractive power;
  wherein the camera optical lens satisfies following conditions:

$-3.50 \leq f2/f1 \leq -1.80$;

$1.00 \leq (R7+R8)/(R7-R8) \leq 1.75$;

$1.30 \leq d6/d4 \leq 2.00$;

$5.00 \leq (R5+R6)/(R5-R6) \leq 20.00$;

$-5.00 \leq R9/R10 \leq -1.50$; and $FNO \leq 2.05$;

where
  f1 denotes a focal length of the first lens;
  f2 denotes a focal length of the second lens;
  R5 denotes a curvature radius of an object-side surface of the third lens;
  R6 denotes a curvature radius of an image-side surface of the third lens;
  R7 denotes a curvature radius of an object-side surface of the fourth lens;
  R8 denotes a curvature radius of an image-side surface of the fourth lens;
  R9 denotes a curvature radius of an object-side surface of the fifth lens;
  R10 denotes a curvature radius of an image-side surface of the fifth lens;
  d4 denotes an on-axis distance from an image-side surface of the second lens to the object-side surface of the third lens;
  d6 denotes an on-axis distance from the image-side surface of the third lens to the object-side surface of the fourth lens; and
  FNO denotes an F number of the camera optical lens.

2. The camera optical lens according to claim 1 further satisfying following condition: $4.00 \leq d1/d2 \leq 8.00$;
  where
  d1 denotes an on-axis thickness of the first lens; and
  d2 denotes an on-axis distance from an image-side surface of the first lens to an object-side surface of the second lens.

3. The camera optical lens according to claim 1 further satisfying following conditions:

$0.37 \leq f1/f \leq 1.30$;

$-3.10 \leq (R1+R2)/(R1-R2) \leq -0.71$; and $0.06 \leq d1/TTL \leq 0.21$;

where
  f denotes a focal length of the camera optical lens;
  R1 denotes a curvature radius of an object-side surface of the first lens;
  R2 denotes a curvature radius of an image-side surface of the first lens;
  d1 denotes an on-axis thickness of the first lens; and
  TTL denotes a total optical length from the object-side surface of the first lens to an image surface of the camera optical lens along an optical axis.

4. The camera optical lens according to claim 1 further satisfying following conditions:

$-5.90 \leq f2/f \leq -0.91$;

$-1.59 \leq (R3+R4)/(R3-R4) \leq 1.96$; and $0.03 \leq d3/TTL \leq 0.09$;

where
  f denotes a focal length of the camera optical lens;
  R3 denotes a curvature radius of an object-side surface of the second lens;
  R4 denotes a curvature radius of the image-side surface of the second lens;
  d3 denotes an on-axis thickness of the second lens; and
  TTL denotes a total optical length from an object-side surface of the first lens to an image surface of the camera optical lens along an optical axis.

5. The camera optical lens according to claim 1 further satisfying following conditions:

$-92.61 \leq f3/f \leq -9.93$; and $0.03 \leq d5/TTL \leq 0.11$;

where
  f denotes a focal length of the camera optical lens;
  f3 denotes a focal length of the third lens;
  d5 denotes an on-axis thickness of the third lens; and
  TTL denotes a total optical length from an object-side surface of the first lens to an image surface of the camera optical lens along an optical axis.

6. The camera optical lens according to claim 1 further satisfying following conditions:

$0.35 \leq f4/f \leq 1.35$; and $0.05 \leq d7/TTL \leq 0.21$;

where
  f denotes a focal length of the camera optical lens;
  f4 denotes a focal length of the fourth lens;
  d7 denotes an on-axis thickness of the fourth lens L4; and TTL denotes a total optical length from an object-side surface of the first lens to an image surface of the camera optical lens along an optical axis.

7. The camera optical lens according to claim 1 further satisfying following conditions:

$-1.30 \leq f5/f \leq -0.37$;

$0.13 \leq (R9+R10)/(R9-R10) \leq 1.00$; and $0.04 \leq d9/TTL \leq 0.13$;

where f denotes a focal length of the camera optical lens;

f5 denotes a focal length of the fifth lens;

d9 denotes an on-axis thickness of the fifth lens; and

TTL denotes a total optical length from an object-side surface of the first lens to an image surface of the camera optical lens along an optical axis.

8. The camera optical lens according to claim 1 further satisfying following condition:

$TTL/IH \leq 1.36$;

where

IH denotes an image height of the camera optical lens; and

TTL denotes a total optical length from an object-side surface of the first lens to an image surface of the camera optical lens along an optical axis.

9. The camera optical lens according to claim 1 further satisfying following condition:

$FOV:79.00°$;

where

FOV denotes an field of view of the camera optical lens.

* * * * *